(12) United States Patent
Marx et al.

(10) Patent No.: US 8,195,207 B2
(45) Date of Patent: Jun. 5, 2012

(54) METHOD FOR THE TRANSMISSION OF DATA TO AT LEAST ONE LISTENING USER OF AN ON-GOING GROUP CALL IMMEDIATELY AFTER SWITCHING SPEAKERS

(75) Inventors: Hans-Jürgen Marx, Starnberg (DE); Faqiang Qian, Vienna (AT); Peter Schmitt, Ludwigsau (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 817 days.

(21) Appl. No.: 12/084,056

(22) PCT Filed: Sep. 12, 2006

(86) PCT No.: PCT/EP2006/066272
§ 371 (c)(1),
(2), (4) Date: Dec. 29, 2008

(87) PCT Pub. No.: WO2007/048658
PCT Pub. Date: May 3, 2007

(65) Prior Publication Data
US 2009/0170489 A1 Jul. 2, 2009

(30) Foreign Application Priority Data
Oct. 24, 2005 (DE) .......... 10 2005 050 850

(51) Int. Cl.
*H04W 4/00* (2009.01)
*H04B 7/00* (2006.01)

(52) U.S. Cl. .......... 455/466; 455/518

(58) Field of Classification Search .......... 455/417–420, 455/518, 445; 370/466, 352–355, 395.52; 379/156–160
See application file for complete search history.

(56) References Cited

U.S. PATENT DOCUMENTS
7,606,261 B2 * 10/2009 Salovuori .......... 370/466
(Continued)

FOREIGN PATENT DOCUMENTS
EP 1480480 11/2004
(Continued)

OTHER PUBLICATIONS $3^{RD}$ Generation Partnership Project: "3GPP TS 43.068 v 7.1.0; $3^{rd}$ Generation Partnership Project; Technical Specification Group Core Network and Terminals; Voice Group Call Service (VGCS); Stage 2 (Release 7)" 3GPP, Sep. 2005 (2005-2009) 109pp.
(Continued)

*Primary Examiner* — Lester Kincaid
*Assistant Examiner* — Kuo Woo
(74) *Attorney, Agent, or Firm* — Staas & Halsey LLP

(57) ABSTRACT

An uplink group call channel is assigned to a second user who acts as the new speaker in order to switch the speaker function from a first user to the second user in an on-going group call within a mobile radio system. The mobile radio system has at least one main mobile exchange and at least one secondary mobile exchange, to each of which at least one base station system is connected. Once the uplink group call channel has been assigned, transmission of data, especially group application data, is initiated via a group call control message to at least one listening user of the group call, particularly the first user. The group call control message is generated by the second user and is transmitted to the main mobile exchange via the uplink group call channel.

27 Claims, 3 Drawing Sheets

U.S. PATENT DOCUMENTS 7,650,159 B2 * 1/2010 Poikselka .................... 455/518

FOREIGN PATENT DOCUMENTS

| RU | 2154348 | 8/2000 |
|----|---------|--------|
| RU | 2224384 | 2/2004 |
| WO | WO 01/65869 | 9/2001 |
| WO | WO 2005/055631 | 6/2005 |
| WO | WO 2005/055632 | 6/2005 |

OTHER PUBLICATIONS

International Search Report, mailed Feb. 13, 2007 and issued in corresponding International Patent Application No. PCT/EP2006/066272.

* cited by examiner

Fig. 3

Talker_Application_Data
(
    - Protocol Discriminator,
    - Transaction ID,
    - Message Type,
    - Application_Data
)

METHOD FOR THE TRANSMISSION OF DATA TO AT LEAST ONE LISTENING USER OF AN ON-GOING GROUP CALL IMMEDIATELY AFTER SWITCHING SPEAKERS

CROSS REFERENCE TO RELATED APPLICATIONS

This application is based on and hereby claims priority to German Application No. 10 2005 050 850.2 filed on Oct. 24, 2005 and PCT Application No. PCT/EP2006/066272 filed on Sep. 12, 2006, the contents of which are hereby incorporated by reference.

BACKGROUND OF THE INVENTION

The invention relates to a method for transmitting data to at least one listening subscriber of an existing group call immediately after switching talkers within a mobile radio system including at least one anchor mobile services switching center and at least one relay mobile services switching center to which in each case at least one base station system is connected, wherein, for changing the talker function from a first subscriber to a second subscriber of the existing group call, an uplink group call channel is allocated to the second subscriber.

Digital mobile radio systems including radio cells are known, for example mobile radio systems based on the GSM (Global System for Mobile Communication) standard via which, in particular, voice group call services (VGCS), voice broadcast service (VBS) can be provided. Such group call services in which in each case a group call is directed to a group of radio subscribers ("subscribers" for short) are defined, for example, in the 3GPP TS 43.068 and 43.069 standards, the subscribers being talking and/or listening users of a mobile communication terminal, for example.

In this context, the subscribers of a group are located in a group call area formed from at least one radio cell, in which the subscribers of the group, controlled via at least one anchor mobile services switching center and possibly further relay mobile services switching centers, can move freely during an existing group call.

The anchor mobile services switching center is in each case connected to the relay mobile services switching centers to which in each case at least one base station system is connected. A base station system generates at least one coverage area in the form of a radio cell. The individual, partially overlapping radio cells form in their totality the entire coverage area of a mobile radio system. In this arrangement, the anchor mobile services switching center is provided for handling and maintaining a group call and the relay mobile services switching center is responsible for controlling and administering the radio cells of the group call area which have not been allocated already to the anchor mobile services switching center.

To identify the potential subscribers of a group call, a special group address information item (group ID) is allocated to them within the mobile radio system, which, for accepting a new group subscriber, is transmitted to them via a short message service (SMS) message. This procedure is known, among other things, by the term OTA (over the air) activation. For this purpose, for example, an OTA server unit is provided in the mobile radio system which implements the generation and updating of current subscriber lists of the group call and the generation of connection parameters required for a group call.

The setting up of a group call according to 3GPP specifications 43.068 and 43.069 requires that a common group call channel is set up for talking and listening users of a communication terminal. For this purpose, a group call is initiated via a so-called dispatcher, i.e. a group subscriber who has authorization to talk within an existing group call even without allocation of the talker function.

The group call channel includes a downlink group call channel and an uplink group call channel, these being set up to each radio cell of the group call area for the respective group. In this context, the uplink group call channel is exclusively provided for the talking subscriber of a group call, whereas all listening subscribers of a group call receive the group call data or group application data, transmitted via the uplink group call channel to the mobile radio system, via the common downlink group call channel.

After the setting up of a group call as described, the uplink group call channel is first allocated to the dispatcher as talker. To change the talker function within an existing group call, the dispatcher releases the uplink group call channel (uplink free message) and informs the other group subscribers about the release of the uplink group call channel. Thereafter, a group subscriber can claim the talker function for himself by requesting the uplink group call channel according to a standardized uplink request method. After a request initiated by a group subscriber taking over the talker function, the uplink group call channel, and thus the talker function, are allocated to him.

In typical group calls, the talk times per talker are very short, seen statically, so that the switching of the talker function from a first subscriber or a first user of a first communication terminal to a second subscriber or to a second user of a second communication terminal, respectively, within an existing group call connection should take place within a very short time. This should take place within a very short time, for example less than 500 ms, particularly if the new talker would like to send a text message to the earlier talker.

However, known signaling protocols in mobile radio systems already existing have a number of time-intensive signaling steps and currently offer no possibility of sending out text data (see SMS service according to 3GPP TS 23.040). In particular, it is not possible for subscribers involved in the switching of talkers to exchange text data with one another.

SUMMARY

In one aspect, an efficient and cost-effective method for transmitting data to at least one listening subscriber of an existing group call immediately after switching talkers is specified.

The inventors propose a method in which, after the allocation of the uplink group call channel, the transmission of data to at least one listening subscriber of the group call is initiated via a group call control message generated by the second subscriber and transmitted via the uplink group call channel to the anchor mobile services switching center. In one embodiment, a transmission of data to the other group subscribers, such as, for example, the subscriber talking last, becomes possible due to a group call control message, set up according to the 3GPP TS 44.068 standard, from the current talker, as a result of which the period of time required for an exchange of messages can be distinctly reduced. In particular, this enables text data to be transmitted between the new talker and the preceding talker within the group call.

BRIEF DESCRIPTION OF THE DRAWINGS

These and other objects and advantages of the present invention will become more apparent and more readily appre FIG. 3 shows, by way of example, a structure of a group control message.

DETAILED DESCRIPTION OF THE PREFERRED EMBODIMENT

Figure 1:
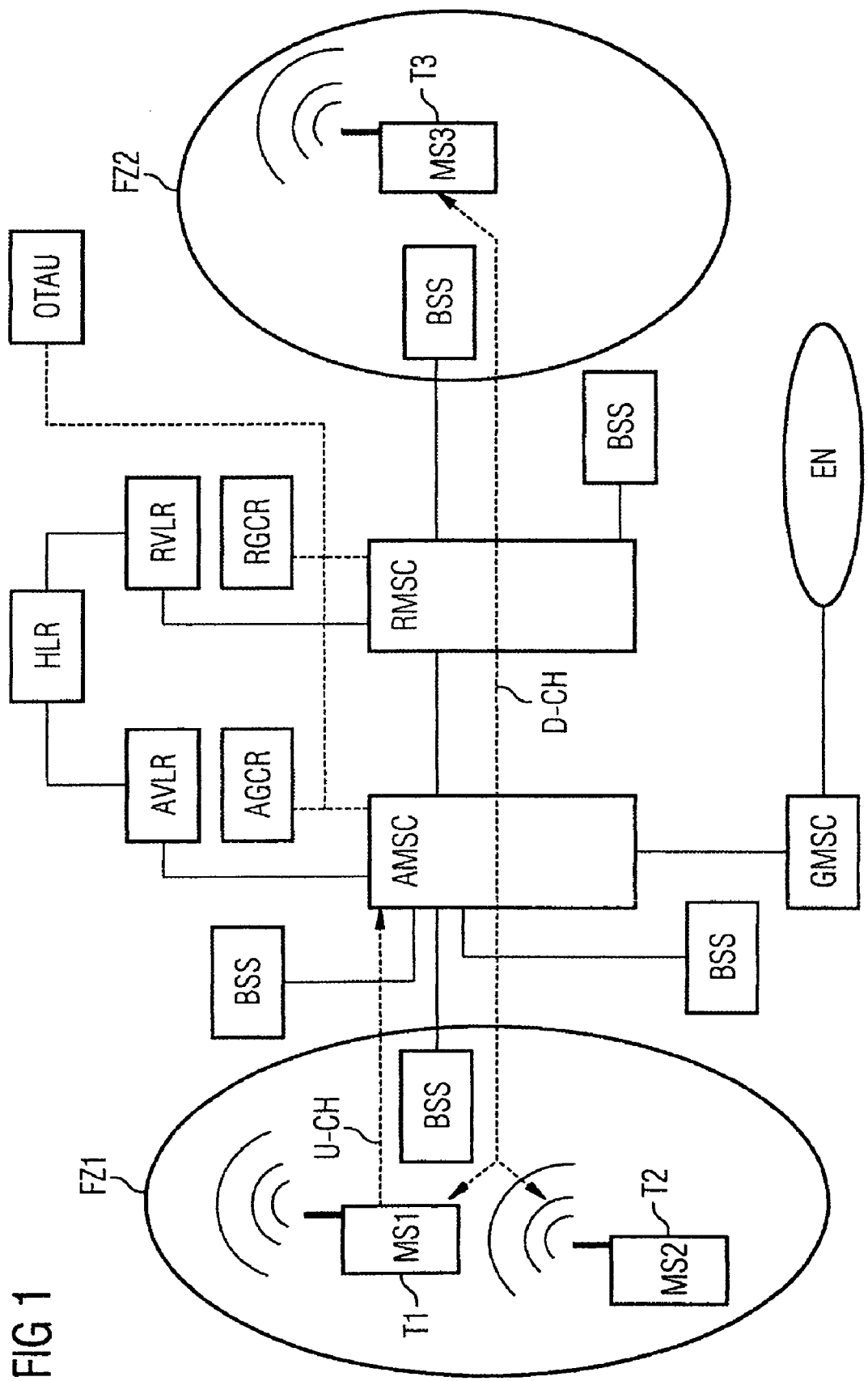
- FIG. 1 shows by way of example in a diagrammatic block diagram an existing group call within a mobile radio system.

Reference will now be made in detail to the preferred embodiments of the present invention, examples of which are illustrated in the accompanying drawings, wherein like reference numerals refer to like elements throughout.

The mobile radio system shown in FIG. 1 in a diagrammatic block diagram, which is based, for example, on the GSM standard, comprises, for example, a number of base station systems BSS and mobile switching centers AMSC, RMSC, GMSC and a number of databases AVLR, RVLR, AGCR, RGCR, HLR and an OTA server unit OTAU. In this arrangement, at least one of the mobile switching centers AMSC, RMSC, GMSC are designed as anchor mobile services switching center AMSC and at least one further one as relay mobile services switching center RMSC and at least one as gateway mobile services switching center GMSC.

The anchor mobile services switching center AMSC and the relay mobile services switching center RMSC is in each case connected to at least one base station system BSS which in each case generates so-called radio cells FZ1, FZ2. The entire coverage area of the mobile radio system is defined by the number of radio cells FZ1, FZ2 in which connections are set up via an air interface, for example from the mobile radio system via the base station systems BSS to the mobile communication terminals or mobile stations MS1-MS3. For setting up the group call, preferred radio cells FZ1, FZ2 are selected from the entire coverage area of the mobile radio system which, considered jointly, form the group call area.

The different mobile switching centers AMSC, RMSC are provided for implementing the mobile-radio-specific switching functions for controlling connections within the mobile radio system. In this arrangement, in each case at least one base station system BSS is allocated to one mobile switching center AMSC, RMSC which is provided for carrying out mobile-radio-specific switching functions relating to the respective base station system BSS.

For example, each of the mobile switching centers AMSC, RMSC can set up a communication link from the mobile radio system to a landline network, for example the public switch telephone network PSTN, or to another data network and to a mobile radio system of another network operator. In the case of a communication link between two mobile stations MS1, MS3 within the mobile radio system, the connection can be set up between a mobile switching center, for example the anchor mobile services switching center AMSC, and a further mobile switching center, for example the relay mobile services switching centers RMSC, or within one and the same mobile switching center AMSC, RMSC. The gateway mobile services switching center connected, for example, at least to the anchor mobile services switching center AMSC forms the interface for the calls arriving in each case from an external telecommunication system EN and for the calls going to an external telecommunication system EN, respectively.

To each of the mobile switching centers AMSC, RMSC, at least one visitor location register AVLR, RVLR is allocated which provides the subscriber data which are required for dealing with the connection of the subscribers T1-T3 who are currently located in the coverage area allocated to a mobile switching center AMSC, RMSC. In addition, at least one central home location register HLR is provided in the mobile radio system, which home location register is connected to the individual visitor location registers AVLR, RVLR. In the central home location register HLR, the subscriber data of the subscribers T1-T3 registered in the mobile radio system are permanently stored, and additionally information about a subscriber's access authorization to the mobile radio system. In addition, the central home location register HLR contains information about the visitor location registers AVLR, RVLR responsible for the subscriber T1-T3 due to his current location within the mobile radio system.

To deal with a group call directed to a group of subscribers, a group call register AGCR, RGCR which contains the group call data for dealing with group calls is in each case allocated to each of the mobile switching centers AMSC, RMSC in addition to a visitor location register AVLR, RVLR according to the TS 43.068 standard. The records contained in the allocated group call registers AGCR, RGCR are organized in accordance with the TS 43.068 standard.

The group call data contain, for example, a list of the radio cells FZ1, FZ2 which form the group call area and are thus available for setting up a group call within the group call area. In this arrangement, reference is made to the list of radio cells FZ1, FZ2 belonging to the group call area by a group call area ID for identifying the group call area and the subscribers T1-T3 belonging to a group are identified by a group ID. In addition, the group call data comprise, for example, a list of selected subscribers (dispatchers) of the associated group who are either authorized for starting such a group call or for ending the group call.

In the present exemplary embodiment, a group call is already set up between a first subscriber T1 or user of the first communication terminal MS1 who, for example, is arranged as dispatcher, and a second subscriber T2 or user of the second communication terminal MS2 and a third subscriber T3 or user of a third communication terminal MS3. In this arrangement, the first and second mobile communication terminal MS1, MS2 are located in a first radio cell FZ1 and the third mobile communication terminal MS3 is located in a second radio cell FZ2, the first radio cell FZ1 being allocated to a base station system BSS which is directly administered by the anchor mobile services switching center AMSC and the second radio cell FZ2 is allocated to a further base station system BSS which is administered via the relay mobile services switching center NMSC connected to the anchor mobile services switching center AMSC.

To transmit group application data Application_Data, i.e. voice data, text data, further payload and control data, etc., a downlink group call channel D-CH is set up in each case to the first and second radio cell FZ1, FZ2 coming from the anchor mobile services switching center AMSC. Furthermore, an uplink group call channel U-CH exists between the first radio cell FZ1 and the anchor mobile services switching center AMSC, which uplink group call channel is allocated to the current talker, i.e. the first subscriber T1 or the user of the first mobile communication terminal MS1, respectively.

The network operator defines a group in the mobile radio system by allocating to certain subscribers T1-T3 at least one specific group ID in their associated group call register AGCR, RGCR. The individual subscribers belonging to the group are here defined by their mobile subscriber integrated services digital network number (MSISDN).

The acceptance of a subscriber in a group is reported to each group subscriber via a first short message service (SMS) message which, for example, is stored on the SIM card of the mobile communication terminal MS1 to MS3. The procedure is known, among other things, by the term OTA (over the air) activation. For this purpose, for example, the OTA server unit OTAU is provided in the mobile radio system, which OTA server unit is in each case connected to the central home location register HLR, the individual visitor location registers AVLR, RVLR and the group call registers AGCR, RGCR.

The OTA server unit OTAU enables the current subscriber lists of the group call to be generated and updated and connection parameters required for a group call to be generated. Furthermore, the first SMS messages required for accepting the individual subscribers are generated by the OTA server unit OTAU and the associated subscriber data are updated in the central home location register HLR, and the individual visitor location registers AVLR, RVLR and the group call data are updated in the group call registers AGCR, RGCR. The SMS messages generated in the OTA server unit OTAU are transmitted to the mobile subscribers via an SMS service center (not shown in the figure) according to the TS 23.040 standard.

If then the role of talker is to change, for example, from the first subscriber T1 to the second subscriber T2, the first subscriber T1 first releases the uplink group call channel U-CH between the first radio cell FZ1 and the anchor mobile services switching center AMSC and this is requested by the subsequent talker, i.e. the second subscriber T2, according to the uplink request method. Following this, the uplink group call channel U-CH is allocated to the second subscriber T2.

Figure 2:
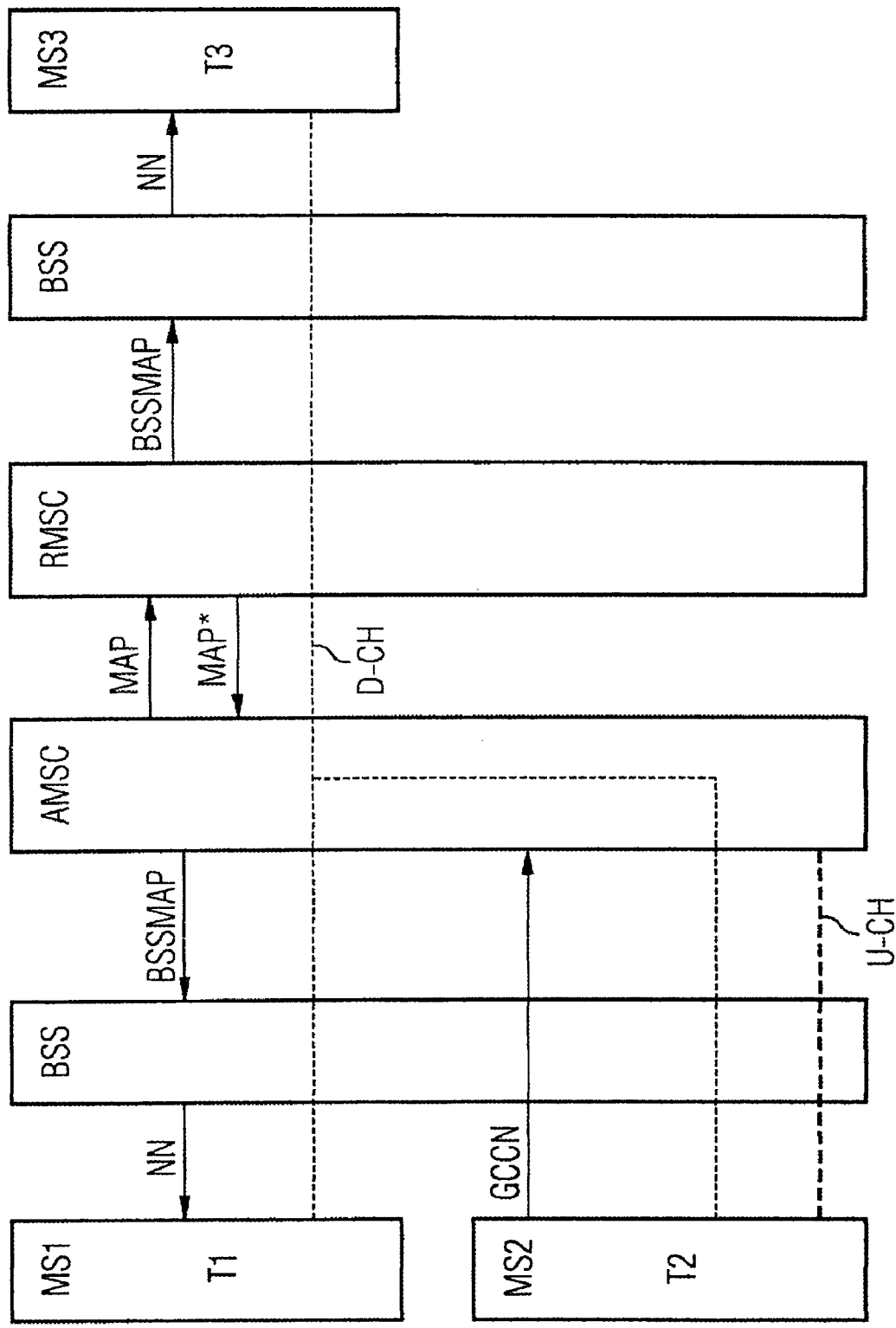
FIG. 2 shows by way of example the individual signaling steps of the method according to the proposed method.

FIG. 2 shows in a diagrammatic block diagram selected elements of the mobile radio system and the signaling steps taking place between these and signaling messages exchanged, respectively.

According to the proposed method, at least one group call control message GCCN is provided which is generated via the A interface, i.e. the interface between the mobile communication terminals MS1, MS2 and the anchor mobile services switching center AMSC by the second subscriber T2 taking over the role of talker or, respectively, the user of the second mobile communication terminal MS2. This is subsequently transmitted preferably via one or more base station systems or base station subsystems BSS, respectively, to the anchor mobile services switching unit AMSC via the uplink group call channel U-CH currently allocated. The group call control message GCCN is structured in accordance with the format specified in the 3GPP TS 44.068 standard.

The message described is thus initiated by the communication subscriber T1, T2, T3 who wishes to send group application data Application_Data as the new talker via the existing group call or wishes to acknowledge the reception of the group application data Application_Data, transmitted before the change of talker, to a further subscriber involved in the group call service (driver).

The group call control message GCCN, which is shown in FIG. 3, can be structured, for example, as follows:

---

Talker_Application_Data
(
    Protocoll Discriminator,
    Transaction ID,
    Message Type,
    Application_Data (
        Data_ID,

---

-continued

Talker_Indication (Mobile Identity),
Data
)
)

---

The group application data Application_Data are inserted into the information data field provided according to standard (3GPP TS 44.068) within the group call control message GCCN and can comprise, for example, voice data, text data or other payload and/or control data. Within the group application data Application_Data, at least one data identity information item Data_ID, preferably constructed as counter, is additionally provided for identifying the data transmitted in each case and a talker identity information item Talker_ID identifying the current talker is provided, wherein the talker identity information item Talker_ID can be, for example, dependent on a device identity information item Mobile_ID allocated to the respective communication terminal MS1-MS3.

In one embodiment, the group application data Application-Data have a maximum length of 20 data octets.

After reception of the group call control message GCCN in the mobile anchor mobile services switching center AMSC, the group application data Application_Data contained in the group call control message are read by said anchor mobile services switching center AMSC and processed further.

For the further processing of the group application data Application_Data, the anchor mobile services switching center AMSC generates an indication message BSSMAP, preferably a base station system management application part (BSSMAP) message, and via this, the group application data Application_Data contained in the group call control message GCCN are transmitted to the respective base station BSS, preferably via a fast associated call control (FAC) signaling channel, the indication message BSSMAP having, for example, the following structure;

---

Talker_Application_Data_Indication
(
    Message Type,
    Talker_Indication (Data_ID, Mobile_Identity),
        Application_Data (
            Data_ID,
            Talker_Indication (Mobile_Identity),
            Data)
        )
)

---

The indication message BSSMAP also contains, apart from the message type, the data identity information Data_ID obtained from the group application data Application_Data, the talker identity information Talker_ID and the device identity information Mobile_ID.

The group call data contained in the indication message BSSMAP must also not exceed a maximum length of 20 data octets.

After reception of this indication message BSSMAP in the respective base station unit BSS, the latter generates a further notification message NN with adapted group application data Application_Data and forwards it via a signaling channel, preferably designed as fast associated call control (FAC), to all communication subscribers T1, T2 associated with the respective base station system BSS or their mobile communication terminals MS1, MS2, respectively, of the group call.

Furthermore, the group application data Application-Data contained in the group call control message GCCN are transmitted via a management application part (MAP) signaling message MAP from the anchor mobile services switching center AMSC to at least one relay mobile services switching center RMSC, the reception of which is acknowledged via at least one further management application part (MAP) signaling message MAP of the anchor mobile services switching center AMSC.

For this purpose, management application part (MAP) signaling messages MAP already provided according to the standard are used which are in each case supplemented by parameters obtained from the group application data Application_Data. For example the signaling messages can have the following structure:

---

Forward_Group Call_Signaling
(Talker_Application_Data/Talker_Application_Data_Ack)
Process_Group Call_Signaling
(Talker_Application_Data/Talker_Application_Data-Ack)

---

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for transmitting data to at least one listening subscriber of an existing group call immediately after switching talkers within a mobile radio system, comprising:
   providing at least one anchor mobile services switching center and at least relay mobile services switching center;
   connecting at least one base station system to the at least one relay mobile services switching center;
   allocating an uplink group call channel to a second subscriber;
   changing the talker function from a first subscriber to the second subscriber of the existing group call;
   generating a group call control message by the second subscriber after allocation of the uplink group call channel;
   transmitting the group call control message to the anchor mobile services switching center via the uplink group call channel; and
   initiating the transmission of data to at least one listening subscriber of the group call via the group call control message.

2. The method as claimed in claim 1, further comprising transmitting group application data.

3. The method as claimed in claim 2, wherein the group application data, apart from voice and/or control data, comprise data identifying the second subscriber as a new talker.

4. The method as claimed in claim 2, further comprising:
   reading out the group application data contained in the group call control message; and
   processing the group application data by the anchor mobile services switching center.

5. The method as claimed in claim 4, further comprising:
   generating an indication message at the anchor mobile services switching center; and
   transmitting the group application data contained in the group call control message to the respective base station systems.

6. The method as claimed in claim 5, further comprising transmitting the indication message to the respective base station systems via a signaling call control protocol signaling protocol.

7. The method as claimed in claim 6, further comprising:
   receiving the indication message in the respective base station; and
   generating a notification message.

8. The method as claimed in claim 1, further comprising transmitting the group application data contained in the group call control message via a management application part signaling message from the anchor mobile services switching center to at least one Relay Mobile Services Switching Center.

9. The method as claimed in claim 8, further comprising acknowledging the reception of the group application data via at least one further management application part signaling message of the anchor mobile services switching center.

10. The method as claimed in claim 1, wherein the group call control message has a structure comprising:
    Talker Application Data
    (
      Protocol Discriminator,
      Transaction ID,
      Message Type,
      Application Data
    ).

11. The method as claimed in claim 4, wherein the group application data contained in the information data field in the group call control message comprise a maximum of 20 data octets.

12. The method as claimed in claim 4, wherein the group application data contained in the information data field of the group call control message contain at least one data identity information item and one talker identity information item.

13. The method as claimed in claim 1, further comprising:
    specifying individually at least one subscriber of the group call; and
    transmitting the group application data to the at least one subscriber of the group call.

14. The method as claimed in claim 1, wherein the at least one listening subscriber is the first subscriber.

15. The method as claimed in claim 1, wherein the group application data is text data.

16. The method as claimed in claim 5, wherein the indication message is a base station system management application part message.

17. The method as claimed in claim 7, further comprising transmitting the notification message via a fast associated call control signaling channel to the subscribers located in the radio cell of the base station system, of the group call.

18. The method as claimed in claim 3, further comprising:
    reading out the group application data contained in the group call control message; and
    processing the group application data by the anchor mobile services switching center.

19. The method as claimed in claim 18, further comprising:
    generating an indication message at the anchor mobile services switching center; and transmitting the group application data contained in the group call control message to the respective base station systems.

20. The method as claimed in claim 19, further comprising transmitting the indication message to the respective base station systems via a signaling call control protocol signaling protocol.

21. The method as claimed in claim 20, further comprising:
receiving the indication message in the respective base station; and
generating a notification message.

22. The method as claimed in claim 21, further comprising transmitting the group application data contained in the group call control message via a management application part signaling message from the anchor mobile services switching center to at least one Relay Mobile Services Switching Center.

23. The method as claimed in claim 22, further comprising acknowledging the reception of the group application data via at least one further management application part signaling message of the anchor mobile services switching center.

24. The method as claimed in claim 23, wherein the group call control message has a structure comprising:
Talker Application Data
(
Protocol Discriminator,
Transaction ID,
Message Type,
Application Data
).

25. The method as claimed in claim 24, wherein the group application data contained in the information data field in the group call control message comprise a maximum of 20 data octets.

26. The method as claimed in claim 25, wherein the group application data contained in the information data field of the group call control message contain at least one data identity information item and one talker identity information item.

27. The method as claimed in claim 26, further comprising:
specifying individually at least one subscriber of the group call; and
transmitting the group application data to the at least one subscriber of the group call.

* * * * *